United States Patent [19]
Hartfiel

[11] Patent Number: 5,214,964
[45] Date of Patent: Jun. 1, 1993

[54] METHOD OF AND APPARATUS FOR MEASURING FIXED AMOUNTS OF FLUID IN A PULSATING FLUID STREAM

[75] Inventor: Johannes Hartfiel, Ludwigshafen, Fed. Rep. of Germany

[73] Assignee: ProMinent Dosiertechnik GmbH, Heidelberg, Fed. Rep. of Germany

[21] Appl. No.: 749,193

[22] Filed: Aug. 23, 1991

[30] Foreign Application Priority Data

Aug. 27, 1990 [DE] Fed. Rep. of Germany ....... 4027028

[51] Int. Cl.⁵ ................................................ G01F 1/72
[52] U.S. Cl. ........................................ 73/861; 73/239
[58] Field of Search ............... 73/239, 861.05, 861.55, 73/861.56, 861

[56] References Cited
U.S. PATENT DOCUMENTS

| | | | |
|---|---|---|---|
| 3,344,667 | 10/1967 | Maltby | 73/239 |
| 4,240,291 | 12/1980 | Anderson et al. | 73/239 |
| 4,507,062 | 3/1985 | Wally | 417/413 |
| 4,523,902 | 6/1985 | Wally | 417/410 |
| 4,537,565 | 8/1985 | Edler | 417/413 |
| 4,547,680 | 10/1985 | Edler | 307/141 |
| 4,947,153 | 8/1990 | Berger | 340/608 |

FOREIGN PATENT DOCUMENTS

| | | |
|---|---|---|
| 0063405 | 8/1987 | European Pat. Off. |
| 1958297 | 11/1969 | Fed. Rep. of Germany |
| 3229788 | 4/1983 | Fed. Rep. of Germany |
| 3833678 | 4/1990 | Fed. Rep. of Germany |
| 60-236755 | 10/1985 | Japan |
| 673892 | 4/1990 | Switzerland |
| 2202331 | 9/1988 | United Kingdom |

*Primary Examiner*—Herbert Goldstein
*Assistant Examiner*—R. L. Biegel
*Attorney, Agent, or Firm*—Peter K. Kontler

[57] ABSTRACT

A quantity flowmeter for measuring the volume of flow of a pulsating fluid stream has a conduit for a freely movable float which is biased against a stop and is moved away from the stop by successive pulses or droplets of the pulsating fluid stream. The float carries or includes a permanent magnet or an electromagnet, and the conduit is surrounded by a self-inductance coil with turns having a density which varies in or counter to the direction of movement of the float away from the stop. When a pulse causes the float to move away from the stop, voltage signals which are generated by the coil and indicate the speed of movements of the float are transmitted to an integrator which transmits integrated signals to a computer. The computer calculates the volume of flow of successive pulses.

30 Claims, 3 Drawing Sheets

METHOD OF AND APPARATUS FOR MEASURING FIXED AMOUNTS OF FLUID IN A PULSATING FLUID STREAM

BACKGROUND OF THE INVENTION

The invention relates to quantity flowmeters in general, and more particularly to improvements in apparatus for measuring fixed amounts of fluids in pulsating fluid streams. The invention also relates to improvements in methods of measuring fixed amounts of fluid in a pulsating fluid stream, e.g., a stream which is discharged by a metering pump.

It is already known to provide a quantity flowmeter with a swimmer or float which is movable back and forth in a conduit serving to convey a continuously flowing stream of fluid. As a rule, the float is biased (e.g., by gravity) counter to the direction of fluid flow in the conduit, and the float defines with the internal surface of the conduit an annular clearance for the flow of fluid around and beyond the float.

Determination of the volume of flow in a conduit for a pulsating fluid stream is often desirable, advantageous and necessary, e.g., to ascertain the quantity of fluid in each fluid pulse which is discharged by the outlet of a metering pump. A metering pump is often utilized to convey highly corrosive (aggressive), toxic or other fluids the flow of which must be regulated with a high degree of accuracy for the reasons of safety or for ecological reasons. Heretofore known quantity flowmeters which are used to ascertain the volume of flow of fluids in a steadily flowing fluid stream are not satisfactory for the measurement of fixed amounts of fluid in a pulsating fluid stream because their dynamics are insufficient and because they operate satisfactorily only when the flow of fluid in a stream is constant or varies gradually per unit of time.

A conventional quantity flowmeter normally employs an upright conduit wherein the float tends to descend under the action of gravity and wherein the inlet for the fluid stream is located at a level beneath the float, i.e., the fluid rises in the conduit and tends to entrain the float in the upward direction. It is also known to employ a spring which biases the float counter to the direction of fluid flow in the conduit. The float is often used as a limit switch to be actuated when the output of a pump which supplies the fluid stream drops below a preselected minimum value. A drawback of such flowmeters is that they can respond only under a single set of specific circumstances, namely when the output of the pump reaches a single preselected value. Such lack of versatility of conventional flowmeters prevents their use under many circumstances when a highly accurate determination of the volume of fluid flow is of considerable importance.

Other known proposals involve the utilization of magnetically inductive quantity flow measurements as well as ultrasonic and mass measurements on the basis of the Coriolis effect. In principle, such measurements could be utilized for determination of the volume of flow of fluid in pulsating fluid streams. However, the cost of a flowmeter whose operation is based on the Coriolis effect is very high. In addition, signals which are generated by such apparatus are not free of noise and, therefore, it is necessary to resort to noise suppressing circuits. A signal which has been caused to undergo noise suppression is not suitable for measurement of the quantity of fluid in short or very short fluid pulses.

Quantity flowmeters the operation of which is based on the positive displacement principle, turbine type counters and rotating impeller flowmeters are not suitable for measurement of the volume of flow in pulsating fluid streams because such streams cause rapid destruction of the flowmeters.

Swiss Pat. No. 673 893 to Barta et al. (granted Apr. 12, 1990) discloses a rotameter which is installed in a conduit for a continuous fluid stream, and an electronic circuit which includes an oscillator and a memory serving to store information pertaining to the position of the float in the conduit for the fluid stream.

UK patent application No. 2 202 331 A of Graham et al. (published Sep. 21, 1988) discloses an electromagnetic transducer wherein the conduit for a float is surrounded by a coil with turns in a stepped or tapered arrangement. The float is acted upon by a continuous stream of gaseous or hydraulic fluid.

European Pat. No. 0 063 405 to Inoue (published Aug. 26, 1987) discloses a fluid flow rate measuring apparatus wherein the diameter of the flow chamber in an upright conduit increases in an upward direction and the conduit is surrounded by a multi-turn single-layer electrical coil having an inter-turn pitch which progressively decreases from the lower end toward the upper end of the conduit. The measuring apparatus is designed to determine the rate of flow of fluid in a continuous fluid stream.

German patent application No. 32 29 788 of Romblom et al. (published Apr. 7, 1983) discloses an apparatus for ascertaining the quantity of fuel per stroke in a fuel injection system for combustion engines. The apparatus employs a plunger which is reciprocable in a pipe surrounded by a coil and receiving the plunger with a certain amount of clearance to permit the flow of fuel. The plunger is movable to a position in which it prevents the flow of fuel. The purpose of the apparatus is to ascertain the distance which is covered by the plunger in response to a fuel impulse because such distance is said to be indicative of the quantity of injected fuel.

German patent application No. 1 958 297 of Brunner (published Jul. 9, 1970) discloses a fluid flow meter which is analogous to that of Inoue.

Japanese patent application No. 60-236755 of Koike (published May 1, 1987) discloses a magnetic flux type flowmeter which tracks the position of a float in a liquid stream.

German patent application No. 38 33 678 of Hornung et al. (published Apr. 5, 1990) discloses an apparatus for measuring the flow of a viscous medium in a conduit. The apparatus employs a piston which is displaced against the opposition of a stressed coil spring. The volume of the viscous fluid which has passed through the conduit for the piston is determined on the basis of the extent of displacement of the piston from a starting position.

OBJECTS OF THE INVENTION

An object of the invention is to provide a method of measuring the quantity of a fluid in a pulsating fluid stream.

Another object of the invention is to provide method which can be resorted to for measurement of the quantity of fluid in a strongly pulsating fluid stream, e.g., a stream which issues from the outlet of a metering pump.

A further object of the invention is to provide a method which renders it possible to ascertain the quantity of fluid in a pulsating fluid stream with a high degree of accuracy.

An additional object of the invention is to provide a method the accuracy and/or reliability of which is not affected by the nature and/or composition of the fluid in the pulsating fluid stream.

Still another object of the invention is to provide a method which renders it possible to accurately measure minute quantities of fluid in a pulsating fluid stream.

Another object of the invention is to provide a novel and improved apparatus for the practice of the above outlined method.

A further object of the invention is to provide a quantity flowmeter which need not rely upon the extent of displacement of a float for accuracy of its measurements.

An additional object of the invention is to provide the quantity flowmeter with novel and improved means for measuring a particular parameter of the float in a conduit which confines and guides a pulsating fluid stream.

Another object of the invention is to provide a quantity flowmeter with novel and improved means for evaluating signals denoting the particular parameter of the float to thus determine the quantity of fluid per pulse or per other selected portion of the fluid stream.

A further object of the invention is to provide a quantity flowmeter which is more accurate and more reliable than heretofore known quantity flowmeters and wherein the parts which come in contact with the pulsating fluid stream can stand long periods of continuous or discontinuous use.

SUMMARY OF THE INVENTION

One feature of the present invention resides in the provision of a method of measuring the quantity of a fluid (e.g., a liquid) in a pulsating fluid stream within a conduit wherein the fluid flows in a predetermined direction from an inlet and which (namely the conduit) contains a swimmer or float (hereinafter called float for short) movable in the predetermined direction against a biasing force (such as gravity and/or spring bias) in response to each pulse of the fluid stream. The method comprises the steps of continuously measuring the velocity of movement of the float in the predetermined direction, and ascertaining the quantity of fluid as a function (i.e., on the basis) of the measured velocity of the float.

The measuring step preferably includes determining the instant or timing of the start of movement of the float in the predetermined direction in response to each pulse, and integrating signals denoting the velocity of the float for a preselected interval of time. The ascertaining step then comprises calculating the quantity of fluid on the basis of the integrated velocity signals. The duration of each preselected interval can coincide with the duration of movement of the float in the predetermined direction under the action of a pulse.

If the duration of each fluid pulse is known and is at least substantially constant, the integrating step can include integrating signals denoting the velocity of the float for the preselected interval of time following each of the aforementioned instants or timings.

The determining step can include monitoring the velocity of the float in the predetermined direction, comparing signals denoting the monitored velocity with a reference signal, and selecting the instant or timing as the time of coincidence of the monitored signal with the reference signal.

The method can further comprise the step of determining the instant of termination of movement of the float in the predetermined direction. Such step can include monitoring the velocity of the float, comparing signals denoting the monitored velocity with a reference signal, and selecting the instant of termination of movement of the float as the time of coincidence of a monitored signal with the reference signal.

The aforementioned calculating step can include multiplying the integrated velocity signals with a value denoting the average cross-sectional area of the passage which is defined by the conduit for the flow of the pulsating fluid stream. The calculating step can further include multiplying or otherwise modifying the product of integrated velocity signal and the average area with a correction factor.

The correction factor can be a constant or such factor can be determined as a function of measured average speed of movement of the float counter to the predetermined direction under the action of the biasing force between successive pulses of the stream. The step of measuring the average speed of movement of the float counter to the predetermined direction can comprise integrating signals denoting the speed during the period of movement of the float counter to the predetermined direction between successive pulses of the stream, and dividing the integrated signals with a value denoting the aforementioned period. The correction factor can be a product of (a) a signal denoting the average speed of movement of the float counter to the predetermined direction, (b) the value denoting the aforementioned period, and (c) the average cross-sectional area of the passage which is defined by the conduit.

Another feature of the invention resides in the provision of an apparatus (quantity flowmeter) for measuring the quantity of a fluid in a pulsating fluid stream. The improved apparatus comprises a conduit having an inlet and defining a passage for the flow of the fluid stream in a predetermined direction, a float which is movable in the passage in the predetermined direction by the pulsating stream and is biased (e.g., by gravity and/or by a spring or other suitable resilient means) to exhibit a tendency toward movement counter to the predetermined direction, and means for measuring the velocity of movement of the float in the passage.

The conduit preferably consists of magnetically non-conductive material, and the measuring means comprises a magnetic field generator (e.g., a permanent magnet) which is movable with the float in the passage of the conduit, at least one coil which surrounds the conduit and has turns the density of which per unit length of the conduit varies in the predetermined direction, and means for evaluating the signals denoting the voltage which is induced in the at least one coil in response to movement of the generator in the passage. The arrangement may be such that the density only increases in the predetermined direction or only counter to the predetermined direction.

The apparatus preferably further comprises means for limiting the extent of movability of the float in and/or counter to the predetermined direction. Such limiting means confine the float to movements within a first portion of the conduit, and the at least one coil can surround the first portion of the conduit as well as at least one second portion of the conduit which is adjacent (upstream or downstream of) the first portion. If the passage of the conduit has a diameter D, the second portion of the conduit can have a length which equals or approximates 2D.

If the passage has a constant diameter, the density of turns per unit length of the conduit preferably increases substantially linearly in the predetermined direction or counter to the predetermined direction, preferably in the predetermined direction.

The density of turns of the at least one coil per unit length of the conduit can vary in steps, either in the predetermined direction or counter to the predetermined direction. The length of such steps can at most equal but can be less or much less than the length of the magnetic field generator (as measured in the predetermined direction). For example, the density of turns per unit length of the conduit can increase in the predetermined direction or counter to the predetermined direction.

If the diameter of the passage varies in the predetermined direction, the density of turns of the at least one coil per unit length of the conduit can vary as a function of variations of the diameter of the passage.

It is equally within the purview of the invention to employ measuring means with a plurality of coils having turns which surround the conduit. Such coils are or can be immediately adjacent one another. The coils preferably have discrete outputs for voltage signals, and the measuring means preferably further comprises discrete voltage amplifiers connected to the outputs of the coils.

A low pass filter can be connected between the output of the at least one coil or between the outputs of plural coils and the evaluating means.

The evaluating means can comprise an integrating circuit for signals which denote voltage and are transmitted by the output or outputs of the coil or coils.

The evaluating means can also comprise a peak value measuring circuit which is connected with the integrating circuit and/or a discriminator circuit which is connected between the output or outputs of the coil or coils and the integrating circuit to energize or activate the integrating circuit when the intensity of a signal at the output exceeds a first value and to deenergize or deactivate the integrating circuit when the intensity of a signal at the output is below a second value.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
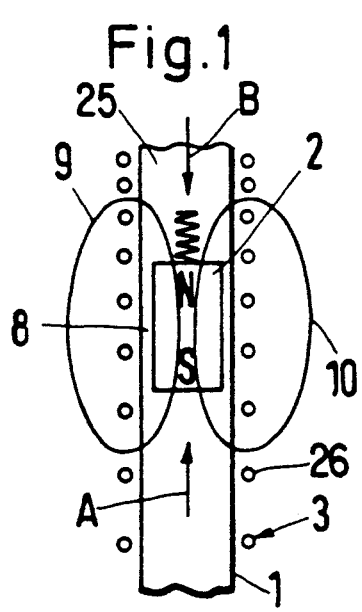
FIG. 1 is a fragmentary diagrammatic elevational view of a quantity flowmeter which embodies one form of the invention.
Figure 2:
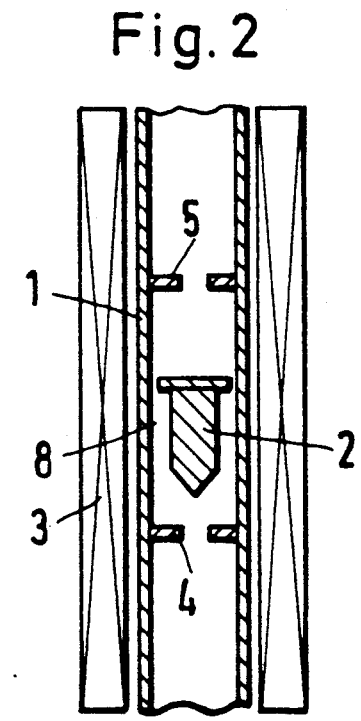
FIG. 2 is a fragmentary axial sectional view of the flowmeter of FIG. 1.

The apparatus (quantity flowmeter) which is shown in FIGS. 1 and 2 comprises an upright conduit 1 defining a passage of constant diameter and receiving with certain clearance 8 a reciprocable swimmer or float 2. The float 2 is acted upon by gravity and, if necessary, by resilient means (a portion of a coil spring 25 is shown in FIG. 1) so that it exhibits a tendency to assume a starting or lower end position of abutment with a first movement limiting means or stop 4. A second movement limiting means or stop 5 in the passage of the conduit 1 determines the maximum extent of upward movement (arrow A) of the float 2 under the action of a pulsating fluid stream which is admitted into the passage through an inlet at a level below the stop 4 and flows in the direction of arrow A.

The throttling or flow restricting action of the clearance 8 and the force of fluid stream establish a pressure differential between the upper and lower end faces of the float 2, and the resulting force causes the float to rise in the direction of arrow A when the inlet of the conduit 1 admits a pulsating fluid stream. The movement of the float 2 with the fluid stream is assisted by friction between the surface of the float and the fluid.

The float 2 includes or constitutes or carries a magnetic field generator (symbolically shown in FIG. 1 by the poles N and S). Such magnetic field generator can be a permanent magnet the magnetic field of which is indicated by two field lines 9 and 10. The magnetic field generator need not constitute the entire float 2 but can and normally does form a relatively small part of the float.

The conduit 1 is surrounded by the windings or turns 26 of a self-inductance coil 3. The coil 3 which is shown in FIG. 1 is designed in such a way that the density of its turns 26 per unit length of the conduit 1 increases in the direction of arrow A, i.e., the mutual spacing of turns 26 decreases in the direction of fluid flow in the passage of the conduit 1. The illustrated coil 3 has a single layer of coils 26; however, it is equally within the purview of the invention to employ a coil with several superimposed layers of turns 26 including a longest innermost layer, a somewhat shorter next-to-the-innermost layer and so forth. Each layer of a set of two or more layers can have turns which are equidistant, e.g., which are immediately adjacent one another. It is also possible to reverse the direction in which the number of turns 26 per unit length of the conduit 1 increases, i.e., to increase the density of turns 26 per unit length of the conduit 1 in the direction of arrow B.

A voltage is induced in the coil 3 in response to a change of magnetic flux in the area which is surrounded by the turns 26. The magnetic flux is a product of magnetic field strength and area. More specifically, the magnetic flux is a product of the average component of magnetic induction perpendicular to any given surface in a magnetic field and the area of such surface. Thus, a voltage can be induced by varying the magnetic field or by varying the area. In the flowmeter of FIGS. 1 and 2, the field of the magnetic field generator is assumed to be constant. The area which is traversed by the magnetic field varies in response to movement of the float 2 in the direction of arrow A or B.

When the float 2 is caused to assume its lower end position, i.e., when it abuts the stop 4, the field lines including those shown at 9 and 10 traverse a total of four turns 26. On the other hand, when the float 2 reaches the upper end position so that it abuts the stop 5, the field lines including those shown at 9, 10 traverse a total of six turns 26. The turns 26 are connected in series; therefore, as the number of turns 26 which are traversed by the field lines including those shown at 9 and 10 increases, this entails a corresponding increase of the area which is traversed by the magnetic field. In the illustrated embodiment, the area increases by 50 percent in response to movement of the float 2 from the lower end position to the upper end position. Thus, the flux in the coil 3 increases. The rising float 2 induces in the coil 3 a positive voltage the amplitude of which is dependent upon the velocity of movement of the float in the direction of arrow A, i.e., upon the speed at which the area which is traversed by the magnetic field changes.

The conduit 1 is made of a magnetically non-conductive material so that it does not influence the magnetic field which is established by the permanent magnet of or on the float 2. The presently preferred material of the conduit 1 is a nonmagnetizable or non-ferromagnetic material.

The lower stop 4 is sufficiently large to arrest the float 3 in a preselected lower end position. In the flowmeter of FIGS. 1 and 2, the float 2 tends to return into engagement with the stop 4 under the action of gravity as well as under the action of the spring 25. The spring 25 is desirable and advantageous when the viscosity of the fluid is high. The upper stop 5 determines the length of that (first) portion of the conduit 1 wherein the float 3 is movable up and down (arrows A and B) and which is surrounded by the turns 26 of the coil 3. Such turns 26 further surround a portion of the conduit 1 downstream and a portion of the conduit 1 upstream of the first portion. When the inlet of the conduit 1 does not receive a pulsating fluid stream, the float 3 abuts the lower stop 4 and is ready to be lifted by the first fluid pulse P (FIG. 9) which rises in the conduit above the lower stop.

An advantage of the feature that the turns 26 of the coil 3 surround the conduit 1 not only upstream but also downstream of the first portion (between the stops 4 and 5) is that one and the same magnetic field acts upon the coil 3 in each and every position of the float 2 (including the upper and the lower end positions). The extent to which the coil 3 projects beyond the stops 4 and 5 will depend upon the nature and upon the geometry of magnetic material which generates the magnetic field represented by the field lines 9 and 10. Experiments indicate that the length of the coil portion above the stop 5 and of the coil portion below the stop 4 need not exceed or need not appreciably exceed the diameter of the passage in the conduit 1.

Figure 4:
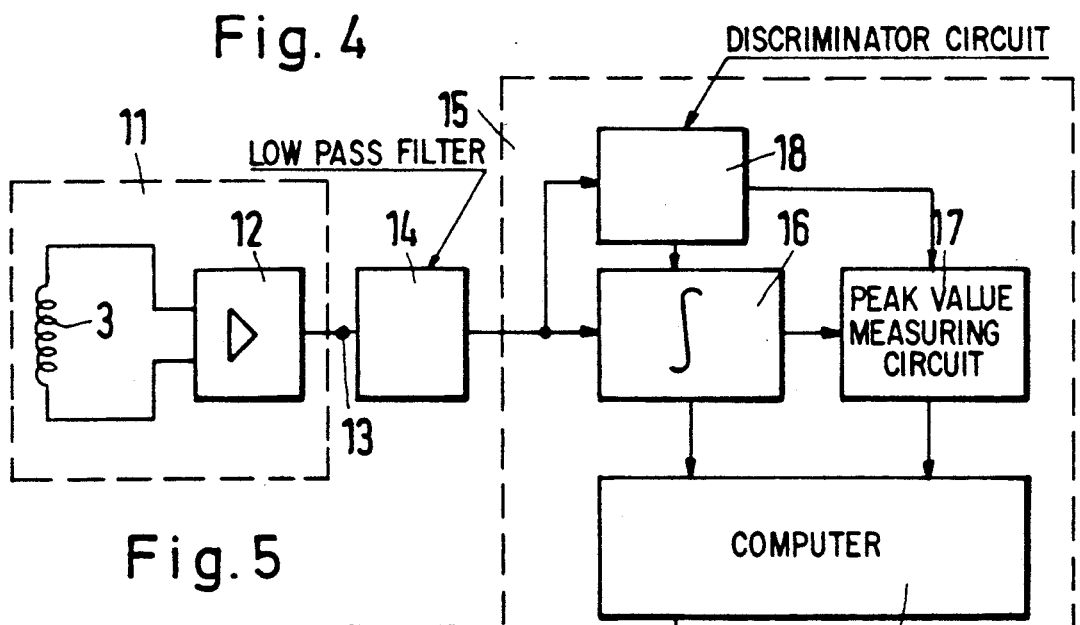
FIG. 4 is a diagram of the measuring and evaluating circuits in the flowmeter which embodies the structure of FIGS. 1 and 2.

FIG. 4 shows the circuits of the means for measuring the velocity of the float 2 during movement in the direction of arrow A or B and of the means for evaluating signals which denote the measured velocity values. The signals which denote the velocity of the float 2 are voltage signals which are induced in the coil 3. The output of the coil 3 transmits voltage signals to an amplifier 12, and the output 13 of the circuit 11 including the coil and the amplifier is connected with one input of a low pass filter 14. The amplifier 12 amplifies the induced voltage signals by a constant factor and its output is connected with the output 13 of the circuit 11. The purpose of the filter 14 is to eliminate signal noise (particularly high-frequency noise), if any. This filter is an optional feature of the measuring means and can be omitted if the signals at the output 13 are processed in a manner which does not require the elimination of noise by a low pass filter. The low pass filter 14 can be installed between the coil 3 and the amplifier 12 without departing from the spirit of the invention.

The output of the filter 14 is connected with an input of an evaluating circuit 15 having an integrating circuit 16 with an input directly connected to the output of the filter 14. An output of the integrating circuit 16 is connected with a peak value measuring circuit 17 which has an output connected to one input of a computer 19. Another input of the computer 19 is connected with a second output of the integrating circuit 16. A discriminator circuit 18 has an input connected with the output of the low pass filter 14, a first output connected with a second input of the integrating circuit 16, and a second output connected with a second input of the peak value measuring circuit 17. The discriminator circuit 18 ascertains the presence of a predetermined voltage signal at the output of the low pass filter 14 and actuates or energizes the integrating circuit 16 when the voltage at the output of the filter 14 exceeds the predetermined value. Thus, the discriminator circuit 18 acts not unlike a signal comparing stage which compares the signals at the output of the filter 14 with a reference signal and actuates or starts the integrating circuit 16 when the intensity of signals at the output of the filter 14 (such signals denote the measured velocity of movement of the float 2 in the conduit 1) exceeds the intensity of the reference signal. The peak value measuring circuit 17 is actuated, energized or started jointly with the integrating circuit 16.

The discriminator circuit 18 further serves to compare the intensity of signals at the output of the low pass filter 14 with a second reference signal and transmits to the circuits 16, 17 a stop or deenergization signal when the intensity of signals at the output of the filter 14 drops below that of the second reference signal. Those signals which are transmitted by the discriminator circuit 18 in response to detection of voltage signals having an intensity less than that of the second reference signal can be used to reset the integrator circuit 16 and/or the peak value measuring circuit 17.

The integrating circuit 16 can integrate in the positive as well as in the negative direction, i.e., it can generate a signal which is indicative of integrated positive or integrated negative voltages.

An output of the computer 19 is connected with a display 20 having a screen or the like to facilitate visual determination of measured fixed amounts of fluid.

Figure 6:
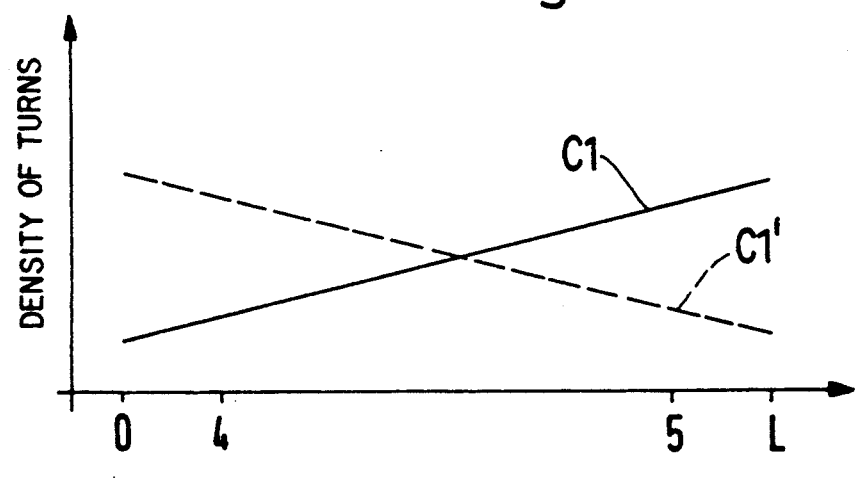
FIG. 6 is a diagram showing two curves which denote certain presently preferred distributions of turns of the coil or coils per unit length of the conduit.

The curve C1 in the diagram of FIG. 6 indicates that the number of turns 26 of the coil 3 increases linearly all the way from the one to the other axial end of the coil. The curve C1 further shows that the turns 26 of the coil 3 extend downwardly beyond the stop 4 to a point O which denotes the lower end of the coil, and upwardly beyond the stop 5 to a point L which is indicative of the upper end of the coil.

The broken-line curve C1' of FIG. 6 denotes the linear decrease of the number of turns 26 per unit length of the conduit 1 if the coil 3 is turned end-for-end, i.e., so that the ends O and L switch positions.

It is further possible to distribute the turns 26 along the external surface of the conduit 1 in such a way that the number of turns increases or decreases linearly between the stops 4, 5 but is constant between O and 4 and/or between 5 and L.

It is preferred to distribute the turns 26 in a manner as denoted by the curve C1 or C1' of FIG. 6 when the diameter of the passage for the flow of a pulsating fluid stream in the conduit 1 is at least substantially constant.

If the diameter of the passage in the conduit 1 for the float 2 increases in the direction of arrow A, dynamic losses which develop in the clearance 8 in the direction of arrow A are compensated for by a more complex distribution of turns 26 per unit length of the conduit. This is to compensate for the effect that, if the velocity of flow remains unchanged but the float 2 continues to rise, the speed of upward movement of the float decreases. Compensation can be achieved by a more rapid increase of the area which is traversed by the magnetic field, for example, by a nonlinear increase of the density of turns 26 per unit length of the conduit 1. At any rate, the density of turns 26 only increases in the direction of arrow A or only in the direction of arrow B. Otherwise stated, a derivation of the density of turns 26 along the conduit 1 is always only not positive or only not negative.

When the float 2 is caused to move in the passage of the conduit 1 (under the action of gravity and under the bias of the spring 25 or in response to admission of a pulsating fluid stream into the conduit 1 at a level below the stop 4), the moving float induces in the coil 3 a voltage having an amplitude which is proportional to the velocity of the float. The amplitude is further proportional to the change of density of turns 26 which form part of the coil 3. If such density change is constant (linear) as indicated by the curve C1 of FIG. 6, the voltage which is induced by the moving float 2 in the coil 3 is directly proportional to the velocity of the float. A constant-speed movement of the float 2 between the stops 4 and 5 induces a constant positive voltage if the north pole N of the magnetic field generator on or in the float faces in the direction of increased density of the turns, i.e., if the float 3 of FIGS. 1 and 2 is caused to move in a direction from the lower stop 4 toward the upper stop 5. A negative voltage is induced in the coil 3 if the direction of movement of the float 2 is reversed, i.e., if the float is free to descend toward the stop 4 under the action of gravity and (if utilized) under the action of the spring 25. Thus, it is possible to ascertain the velocity as well as the direction of movement of the float 2 without the establishment of any contact between the float and the conduit 1 and/or coil 3.

Figure 7:
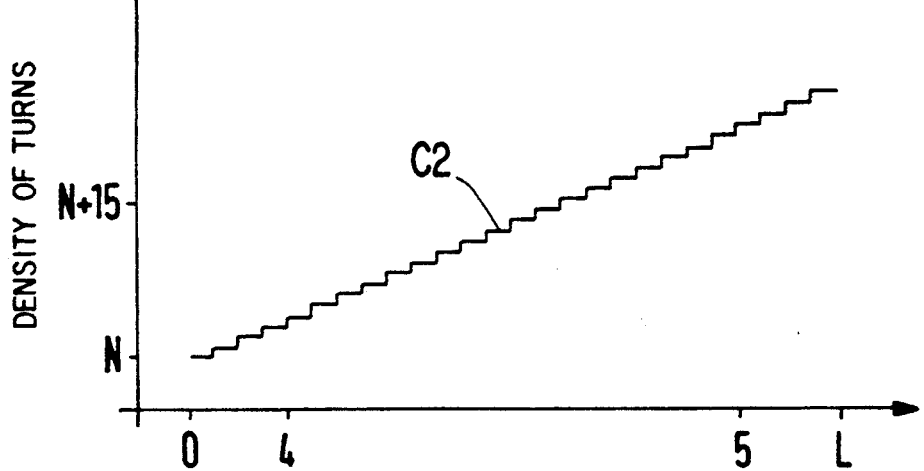
FIG. 7 is a similar diagram showing a curve which denotes a different distribution of turns.

It has been found that, in actual practice, it is quite difficult to achieve a linear increase or a linear reduction of the density of turns 26 per unit length of the conduit 1 all the way between the ends O and L of the coil 3. The simplest way of increasing or reducing the density of turns 26 is to achieve a stepwise or stagewise increase or reduction, for example, as represented by the curve C2 in the diagram of FIG. 7. Thus, the number of windings or turns 26 is increased by a selected value per unit length of the conduit 1. This causes the moving float 2 to induce in the coil 3 (having turns 26 distributed in a manner as indicated by the curve C2 of FIG. 7) a voltage impulse when the magnetic field of the permanent magnet on or in the float advances to the next step, i.e., in response to each change of the area which is traversed by the magnetic field. The amplitude of the voltage impulse depends exclusively upon the velocity of the float 2. If the dimensions of the permanent magnet (in the direction of arrow A or B) match or exceed the length of individual steps or stages, the permanent magnet exerts a balancing, equalizing or levelling influence, i.e., the output 13 of the circuit 11 including the coil 3 and the amplifier 12 transmits a practically linear voltage signal as long as the velocity of the float 2 is constant. In other words, the signal at the output 13 is practically devoid of steps or similar irregularities.

Figure 8:
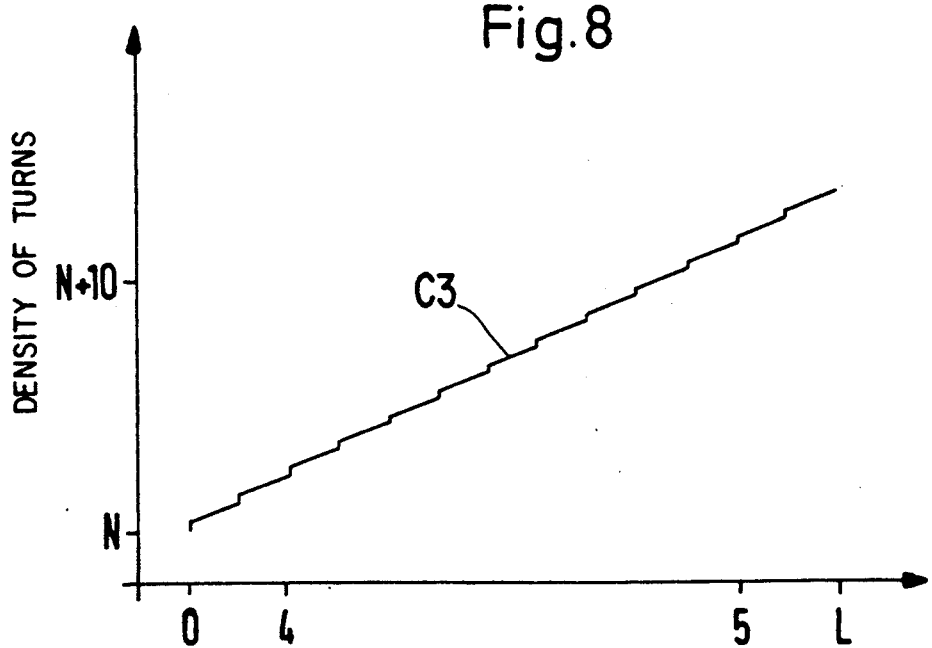
FIG. 8 is a similar diagram wherein the curve shows a further distribution of turns in the coil or coils which surround the conduit.

Another mode of varying the density of turns 26 per unit length of the conduit 1 is indicated by the curve C3 of FIG. 8. This mode is superior to that which is denoted by the curve C2 of FIG. 7 but is more expensive. The density of turns 26 again increases in steps or stages; however, the density also varies within each step or stage. This can be achieved by distributing the turns 26 in each step or stage in a manner as shown in FIG. 1, i.e., so that the pitch of the turns varies in the direction of arrow A or B and, therefore, the turns are nearer to each other at one end but are more distant from each other at the other end of each step or stage. For example, the turns 26 which are represented by any one of the steps of the curve C3 in the diagram of FIG. 8 will be spaced apart from each other at one end but will nearer to or actually contact each other at the other end of the respective step. Some irregularities in the rate at which the density of turns 26 within individual steps or stages increases or decreases are difficult to avoid, particularly at the lower-density end of the step; nevertheless, the variation of density of the turns is more satisfactory than that which is represented by the curve C2 of FIG. 7. The aforediscussed averaging, levelling or equalizing effect of a permanent magnet having a length which at least equals the length of a step in the curve C3 ensures that the output of the circuit 11 including a coil 3 with turns 26 distributed in a manner as represented by the curve C3 transmits a linear voltage signal as long as the velocity of the float 2 remains constant.

Figure 9:
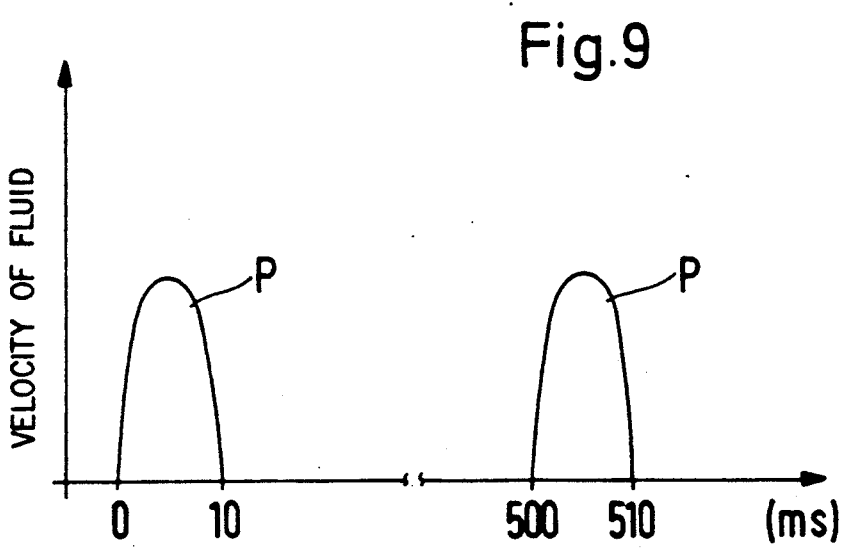
FIG. 9 is a diagram showing the pulses of a fluid stream which can be measured with the flowmeter of the present invention.

The diagram of FIG. 9 shows the velocity of a pulsating fluid stream. The velocity of the flow is measured along the ordinate and the time (in milliseconds) is measured along the abscissa. Thus, the flow of fluid is not continuous but takes place at intervals. The amplitude of each pulse P may but need not be the same but it is assumed that the width (duration) of each pulse is 10 ms. For example, the fluid flow which is shown in the diagram of FIG. 9 can match or resemble that of a pulsating fluid stream which issues from a metering pump.

The improved quantity flowmeter can be utilized to ascertain the quantity of fluid in each pulse P of the pulsating fluid stream with a high degree of accuracy. Thus, each pulse causes a movement of the float 2 in the direction of arrow A. If no fluid were to flow past the float 2 (in and beyond the clearance 8), the velocity of fluid in the conduit 1 would be matched by the velocity of the float 2. However, and since a clearance 8 does exist and since the float 2 has a certain weight, there develops a pressure differential between the two end faces of the float and, consequently, advancement of each and every pulse P in the conduit 1 involves the flow of a certain percentage of fluid forming the pulse in the clearance 8 and relative to the float. Thus, the velocity of the float in the direction of arrow A is less than the velocity of fluid which forms a pulse P. The clearance 8 is necessary because it permits or facilitates return movement of the float 2 into contact with the lower stop 4 when a pulse P has been caused to advance beyond the stop 5.

Figure 10:
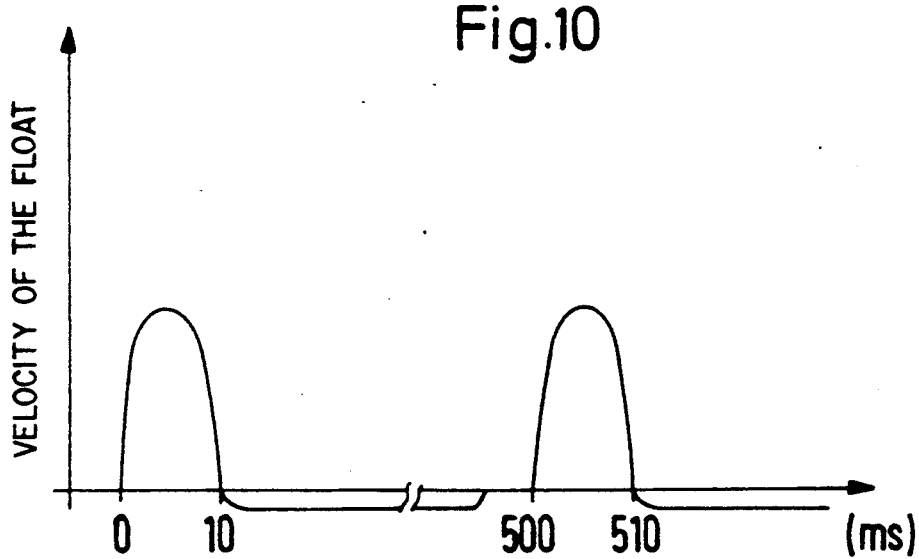
FIG. 10 is a diagram wherein the curves indicate the velocity of the float as a function of time.

FIG. 10 shows schematically the velocity of the float 2. Such velocity is a function of the speed of the pulse P while the float is being entrained by the fluid. The velocity is positive. When the pulse P has risen above the float 2, the float 2 begins to move in the direction of arrow B at a (negative) speed which is considerably less than the velocity of movement in the direction of arrow A. If the frequency of pulses P is sufficiently low, the float 2 returns into contact with the lower stop 4 before it is lifted again by the next pulse.

Figure 11:
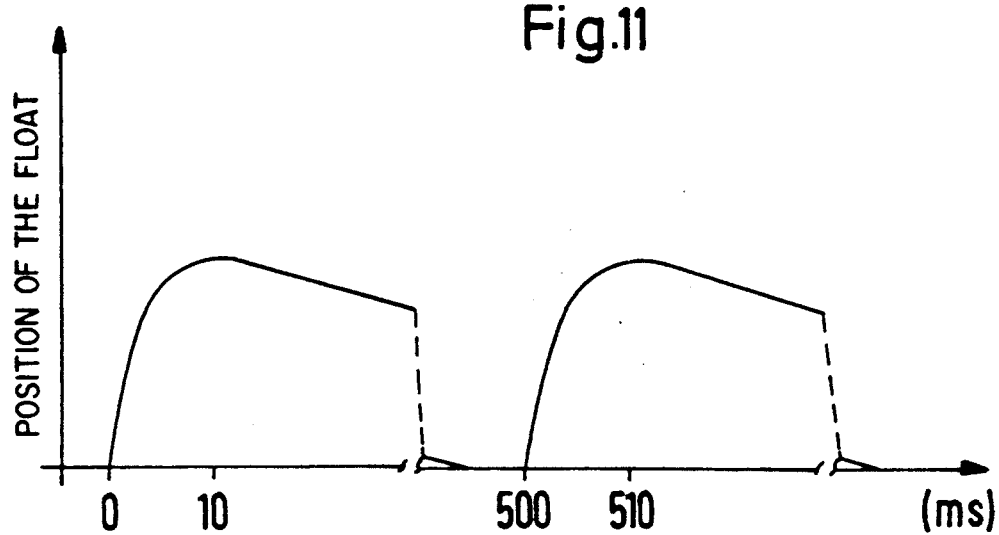
FIG. 11 is a diagram wherein the curves denote the position of the float in the conduit as a function of time.

If the signals denoting the velocity of movement of the float 2 in the direction of arrow A are integrated for the duration of a pulse P, one can ascertain the extent of upward movement of the float as a function of time. Such position of the float (as a function of time) is shown in the diagram of FIG. 11. The float 2 reaches its upper end position when the flow of fluid forming a pulse (i.e., of a batch of fluid) in the clearance 8 is completed. The position of the float 2 is ascertained by the integrating circuit 16 and the peak value (i.e., the maximum upward stroke) is determined by the peak value measuring circuit 17. If one were to disregard the losses at the clearance 8, the maximum stroke of the float 2 multiplied by the average cross-sectional area of the passage in the conduit 1 would denote the sought-after quantity of fluid per pulse. The maximum stroke (i.e., the uppermost level) of the float 2 can be ascertained by integrating signals denoting the velocity of upward movement of the float 2 between the instant or timing of initial impingement of a pulse P upon the float and the instant or timing of advancement of the pulse beyond the lifted float.

The start and termination of contact between the float and a pulse are ascertained by the discriminator circuit 18 which actuates the integrating circuit 16 as soon as the velocity of the float 2 in the direction of arrow A rises above a predetermined reference value (e.g., zero), i.e., as soon as the intensity of signal at the output 13 exceeds a first value. Analogously, the discriminator circuit 18 deactivates or deenergizes the integrating circuit 16 as soon as the velocity of the float 2 in the direction of arrow A drops below a second value, i.e., as soon as the intensity of voltage signal at the output 13 drops below a second predetermined value.

The computer 19 calculates the volumes of the pulses P (i.e., the quantity of liquid in each pulse) by multiplying a value representing the maximum stroke of the float 2 with a value denoting the cross-sectional area of the passage in the conduit 1. The thus obtained information is observable on the screen of the display 20.

The display 20 is optional. Furthermore, in addition to or in lieu of displaying the desired information at 20, the computer 19 can transmit appropriate signals directly to the motor of a metering pump. Thus, the signals which are transmitted by the computer 19 and denote the quantity of fluid in the pulses P can be further processed and put to use without being displayed at 20 or elsewhere.

As mentioned above, the discriminator circuit 18 is preferably designed to reset the integrating circuit 16 and the peak value measuring circuit 17 during the intervals between admission of successive pulses P into the conduit 1.

The aforedescribed method of ascertaining the quantity of fluid in each pulse P is sufficiently accurate and reliable if the loses of fluid which flows in the clearance 8 relative to the float 2 are negligible, namely because the clearance 8 is very narrow, the density of the float 2 only slightly exceeds the density of the fluid and/or the viscosity of the fluid is very high. Under such circumstances, the velocity of upward movement of the float 2 practically matches or very closely approximates the velocity of the ascending fluid. As a rule, the viscosity of conveyed fluid is determined in advance; however, the other two parameters which influence the accuracy of measurement can be varied within a wide range. Thus, the width of the clearance 8 can be altered by changing the dimensions of the float 2.

Losses which develop as a result of fluid flow in the clearance 8 relative to the float 2 cannot be reduced at will (which would be desirable in order to enhance the accuracy of the quantity flowmeter), mainly because the float 2 should descend onto the stop 4 during the intervals between admissions of successive pulses P into the passage of the conduit 1. Since the factors which influence the speed of downward movement of the float 2 toward the stop 4 and the factors which influence the magnitude of dynamic loses in the clearance 8 during upward movement of the float are the same, any narrowing of the clearance 8 will result in deceleration of the float during movement in the direction of arrow B. Therefore, it would be necessary to unduly increase the duration of intervals between successive pulses P in order to ensure that the float 2 will reengage the stop 4 prior to being contacted by the fluid of the next oncoming pulse P.

In order to permit pronounced dynamic losses at the clearance 8 (and to thus ensure rapid descent of the float 2 into contact with the stop 4), it is possible to ascertain the speed of downward movement of the float 2 in the absence of any fluid or when the fluid flow in the conduit 1 is small or negligible and to calculate a correction factor which is used in the computer 19 to correct the signal which is transmitted by the integrating circuit 16. This can be achieved by utilizing the integrating circuit 16 as a means for integrating (as a function of time) signals denoting the speed of movement of the float 2 in the direction of arrow B. The signal which denotes the integrated speed of downward movement of the float 2 can be divided (in the computer) by a factor denoting the interval of time which elapses during downward movement of the float. The resulting signal is indicative of the average speed of movement of the float 2 toward the stop 4.

One can safely assume that the quantity of fluid which flows past the float 2 during propagation of a pulse P in the passage of the conduit 1 (and which affects the accuracy of measurement of the volume of flow) equals the quantity of fluid that flows past the float 2 while the latter descends toward the stop 4. Based on such approximation, the computer 19 can be utilized to calculate a correction factor by multiplying the average speed of downward movement of the float with a value denoting the duration of a pulse and the average cross-sectional area of the passage in the conduit 1. The correction value is added to the uncorrected value denoting the volume of flow. In this manner, one can correct the systematic error which is attributable to dynamic losses at the clearance 8 and to generate signals denoting the volume of flow per pulse P with a minimal error. At the same time, it is possible to establish a rather wide clearance 8, i.e., to permit rapid descent of the float 2 against the lower stop 4. This, in turn, renders it possible to measure the quantity of liquid in each pulse even if the intervals between admissions of successive pulses into the conduit 1 are short or extremely short. This is often the case in connection with the pulsating fluid flow which is established by a magnetically driven metering pump.

It is possible to dispense with the determination of certain parameters if the operating conditions remain unchanged. For example, it is possible to ascertain dynamic loses at the clearance 8 only once and to select a constant correction factor on the basis of such single determination of dynamic losses. The correction factor is used to modify the signal which is generated by the computer 19, e.g., the correction factor can be added to the result of measurement which is furnished by the computer.

It is also possible to omit the determination of timing of completion or termination of a pulse P if the width of the pulse (i.e., its duration as measured along the abscissa in the diagram of FIG. 9) is known. This is normally the case when the stream issues directly from the apparatus or machine (e.g., a pump) which generates the pulsating fluid stream. If the duration of pulses of the pulsating fluid stream issuing from a metering pump or another source is known, it is possible to start the integrating circuit 16 simultaneously with the start of upward movement of the float 2 or with a preselected fixed delay following the start of upward movement, and to deactivate the integrating circuit 16 simultaneously with completion of the upward movement of the float. This renders it unnecessary to ascertain whether or not the float 2 is in actual motion.

A prerequisite for successful measurement of the volume of pulses P is that the intervals between the admission of successive pulses into the conduit 1 are sufficiently long to permit a return movement of the float 2 toward the stop 4, i.e., in a direction away from the stop 5. The rate of flow between successive pulses P can but need not be reduced all the way to zero, as long as it is sufficiently low to permit the float 2 to move in the direction of arrow B. Such circumstances often develop at the outlets of pumps which are designed to deliver metered quantities of a fluid in pulsating fashion, especially metering pumps with magnetic drives. Reference may be had, for example, to U.S. Pat. No. 4,507,062 granted Mar. 26, 1985 to Wally; U.S. Pat. No. 4,523,902 granted Jun. 18, 1985 to Wally; U.S. Pat. No. 4,537,565 granted Aug. 27, 1985 to Edler; U.S. Pat. No. 4,547,680 granted Oct. 15, 1985 to Edler and U.S. Pat. No-4,947,153 granted Aug. 7, 1990 to Berger. The improved flowmeter renders it possible to ascertain the quantity of fluid in each of a short or long series of successive pulses P. Moreover, the measurement is much more accurate than those conventional measurements which involve averaging the quantity of fluid in several pulses.

Signals which are transmitted to the computer 19 can be processed to indicate the speed of the fluid in the conduit 1. Once the speed of the fluid is known, it is simple to determine the volume of flow of fluid which forms the pulses P.

As already mentioned above, the discriminator circuit 18 can be designed to start the integrating circuit 16 when it ascertains that the float 2 has been set in motion in the direction of arrow A. The circuit 16 then remains operative for a certain period of time, and the signals which are transmitted by the circuit 16 to the computer 19 are processed to furnish information denoting the quantity of fluid which has caused the float 2 to leave its starting position and to move toward or all the way into engagement with the stop 5. Such processing involves the determination of distance which is covered by the float 2 during movement away from the stop 4 and a signal denoting such distance is used to calculate the volume of flow. The intervals during which the circuit 16 is operative can vary from pulse to pulse but the parameters which determine the start and the termination of operation of the circuit 16 are fixed. Reference may be had to the preceding discussion of the function of the discriminator circuit 18. It is often preferred to select the intervals of operation of the integrating circuit 16 to coincide with intervals between the instants of setting the float 2 in motion in the direction of arrow A and the instants of termination of movement of the float in such direction. This renders it possible to ascertain, with a high degree of accuracy, the distance which is covered by the float 2 in the direction of arrow A during advancement of a pulse P (e.g., a droplet) past the velocity measuring station. Accurate determination of the distance which is covered by the float 2 in the direction of arrow A renders it possible to ascertain the volume of flow with a high degree of precision.

The situation is much simpler if the duration of pulses P is known and is constant. It is then merely necessary to start the integrating circuit 16 jointly with the start of movement of the float 2 away from the stop 4 and to maintain the circuit 16 in operation for a preselected period of time, preferably a period of time which corresponds to the duration of a pulse P. Such situation will arise when the design of the pump which supplies the pulsating fluid stream is known. The quantity of fluid can vary from pulse to pulse, i.e., the distances which the float covers during successive movements away from the stop 4 need not be equal. Nevertheless, it is not necessary to compare the signals denoting the velocity of the float with a reference signal and to deactivate the integrating circuit 16 when the intensity of a velocity signal drops below the intensity of the reference signal.

If the discriminator circuit 18 is used to compare the signals at the output of the low pass filter 14 with two reference signals, the intensities of such reference signals may but need not be identical. As mentioned above, the arrangement may be such that the circuit 18 starts the integrating circuit 16 when the intensity of a signal at the output of the low pass filter 14 exceeds a first reference value, and the circuit 16 is arrested or deactivated when the intensity of signal at the output of the filter 14 drops below a second reference value. The measuring apparatus is "informed" that a pulse P advances in the conduit 1 when the intensity of a signal at the output of the low pass filter 14 exceeds the intensity of the first reference signal.

The calculation of a correction factor and the utilization of such correction factor to modify the information which is being processed in the computer 19 constitutes an optional but desirable feature of the improved method and apparatus. The correction factor is not ascertained or need not be ascertained when the clearance 8 is very narrow, when the density of the float 2 does not appreciably exceed the density of the conveyed fluid and/or when the viscosity of the fluid is high. Under such circumstances, the velocity of the float 2 matches or closely approximates the velocity of the fluid in the conduit 1 and the distance covered by the float is indicative (with a high degree of accuracy) of the volume of the advancing pulse P. Since the signal at the output of the integrating circuit 16 denotes the distance which is covered by the float 2 in a direction away from the stop 4, simple multiplication of such signal with a value denoting the average cross-sectional area of the passage in the conduit 1 furnishes information denoting the measured volume of the respective pulse or drop.

The utilization of a correction factor which is a product of the average speed of the float 2 in the direction of arrow B, the interval of integration to ascertain such average speed, and the average cross-sectional area of the passage in the conduit 1 renders it possible to determine the volume of flow of successive pulses P with a very high degree of accuracy. Such correction factor can compensate for the systematic measurement error which is attributable to dynamic losses in the clearance 8. As mentioned above, the fluid flows in the clearance 8 during movement of the float 2 away from the stop 4 as well as during movement of the float back toward its lower end position, i.e., when the float is acted upon by the spring 25 and/or by gravity. The correction factor denoting such quantity of fluid is simply added to the calculated volume of flow. The reason is that the interval or period of integration corresponds to or approximates the interval of flow of fluid forming a pulse P past the measuring station.

The correction factor will be a constant if the dimensions of the passage in the conduit 1 and the dimensions of the float 2 are known, if the viscosity of the fluid is known and if the duration of the pulses P is also known. This simplifies the construction of the apparatus because it is not necessary to ascertain the speed of movement of the float 2 in the direction of arrow B.

The improved quantity flowmeter departs from quantity flowmeters which are used to ascertain the volume of flow of continuously flowing fluid streams in several important respects. Thus, instead of increasing the dynamics of conventional quantity flowmeters for the purpose of enabling them to measure the volumes of pulsating fluid streams, the improved flowmeter is designed in such a way that it measures only the volume of flow of pulsating fluid streams. Furthermore, though the improved flowmeter can be utilized to ascertain the position of the float 2 in the conduit 1, the volume of flow of the pulsating fluid stream is ascertained on the basis of signals which denote the velocity of movement of the float 2 away from its starting position, i.e., from the lower end position if the orientation of the conduit 1 is such that the fluid is to flow upwardly. The position of the float 2 in the improved flowmeter is proportional to the average speed of the fluid in the conduit 1 only when the speed of the fluid is constant.

An important advantage of the improved flowmeter is that it can measure the volume of flow of a pulsating fluid stream with a high degree of accuracy in spite of the simplicity of its design and its low cost. This holds particularly true if the cost of the improved flowmeter is compared with that of an ultrasonic flowmeter, a magnetically inductive flowmeter or a laser-doppler anemometer.

The stop 5 is optional but desirable and advantageous. As a rule, this stop is sufficiently remote from the stop 4 to ensure that the float 2 can rise during each and every stage of advancement of a pulse. The main purpose of the stop 5 is to prevent expulsion of the float 2 from the measuring station in response to an unexpectedly strong pulse.

The permanent magnet of or on the float 2 can be replaced with an electromagnet without departing from the spirit of the invention. An advantage of a permanent magnet is that the designer of the flowmeter can dispense with conduits for connection of the electromagnet with an energy source.

Though it is possible to shorten the coil 3 so that it does not extend beyond the stop 5 and/or beyond the stop 4, the illustrated coil is preferred because it ensures that the entire magnetic field of the magnet on or in the float 2 traverses the coil 3 in each and every position of the float. In the absence of turns 26 beneath the stop 4 or in the absence of turns 26 which are traversed by the field lines including the lines 9, 10 in the lower end position of the float 2, the latter would cause the coil 3 to induce very strong voltage signals in response to lifting of the float above the stop 4.

Figure 3:
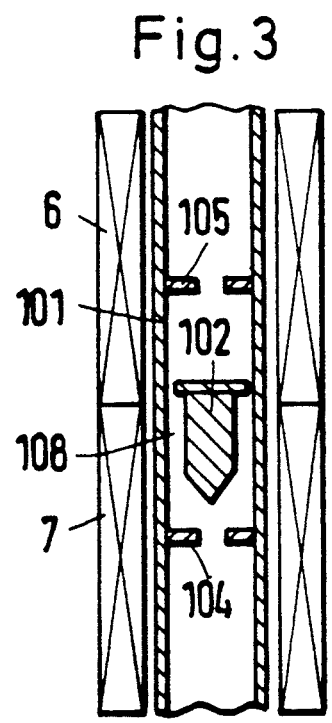
FIG. 3 is a similar fragmentary axial sectional view of a modified flowmeter with two coils around the conduit.

FIG. 3 shows a modified flowmeter with a conduit 101 having internal stops or movement limiting means 104, 105, a float 102, an annular clearance 108 between the float and the internal surface of the conduit between the stops 104, 105, and a composite coil including two discrete coils 6, 7 which are immediately adjacent each other. An advantage of the flowmeter of FIG. 3 is that a relatively long composite coil can be assembled of a plurality (two, three or more) of shorter coils, i.e., it is not necessary to limit the extent of movability of the float 102 between its upper and lower end positions on account of the lack of a single elongated coil. Moreover, the extent of movability of the float 102 in the conduit 101 can be increased by the simple expedient of placing two, three or more coils end to end.

Figure 5:
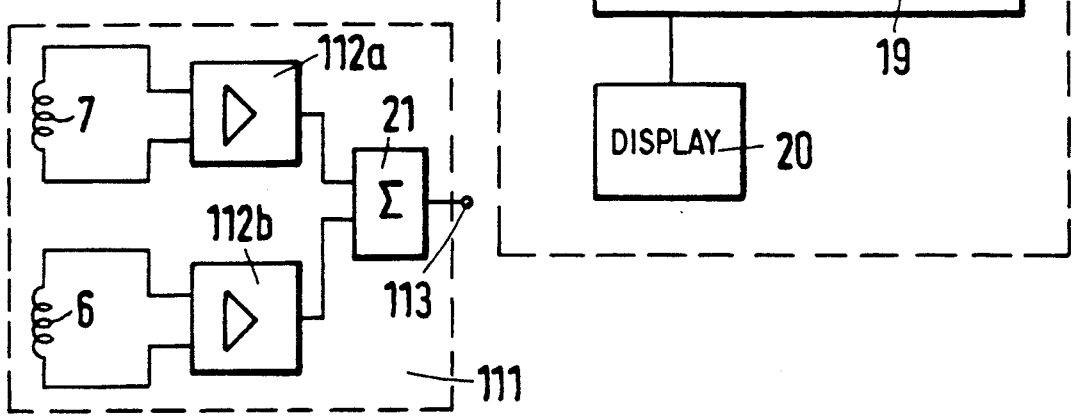
FIG. 5 shows certain portions of the circuits in the flowmeter which embodies the structure of FIG. 3.

A portion of the velocity measuring in an apparatus employing the coils 6 and 7 of FIG. 3 is shown in FIG. 5. The coils 6 and 7 are connected with discrete amplifiers 112b, 112a, respectively, and the outputs of the two amplifiers are connected to the corresponding inputs of a digital or analog summing circuit 21 having an output connected to the output 113 of the circuit 111 including the coils 6, 7 and the amplifiers 112a, 112b. The output 113 is connected with an input of a low pass filter corresponding to the low pass filter 14 of FIG. 4.

The coils 6, 7 can be connected in series, and the common output of such series-connected coils can be connected to the input of a single amplifier corresponding to the amplifier 12 of FIG. 4.

The circuit of FIG. 5 will have three or more amplifiers if the conduit 1 or 101 is surrounded by a composite coil having three or more coils; such coils are preferably closely or immediately adjacent one another.

The apparatus which embodies the structure of FIGS. 3 and 5 exhibits the advantage that it reduces the likelihood of undue influence of external disturbances upon the measuring action.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A method of measuring the quantity of a fluid in a pulsating fluid stream within a conduit wherein the fluid flows in a direction from an inlet and which contains a float movable in said direction against a biasing force in response to each of a series of successive pulses of the fluid stream and performs a return movement counter to said direction between successive pulses of the stream, comprising the steps of continuously measuring the velocity of movement of the float in said direction including determining the instant of start of movement of the float in said direction in response to each pulse, generating signals which denote the velocity of the float, and integrating the signals denoting the velocity of the float for a predetermined interval of time; and ascertaining the quantity of fluid as a function of the measured velocity of the float including calculating the quantity of fluid on the basis of the integrated signals.

2. The method of claim 1, wherein the duration of each interval coincides with the movement of the float in said direction in response to a pulse of the fluid stream.

3. The method of claim 1, of measuring the quantity of fluid in a fluid stream wherein the duration of each of a series of consecutive pulses is known and is substantially constant, said integrating step including integrating the signals denoting the velocity of the float for said predetermined interval of time following each of said instants.

4. The method of claim 1, wherein said determining step includes monitoring the velocity of the float in said direction, comparing the monitored velocity to a reference value, and selecting the instant as the time of coincidence of the monitored velocity with the reference value.

5. The method of claim 1, further comprising the step of determining the instant of termination of movement of the float in said direction, including monitoring the velocity of the float, comparing the monitored velocity with a reference value, and selecting the instant of termination of movement of the float as the time of coincidence of the monitored velocity with the reference value.

6. The method of claim 1 of measuring the quantity of a fluid within a conduit defining a passage having a predetermined average cross-sectional area, wherein said calculating step includes multiplying the integrated signals with said area.

7. The method of claim 6, wherein said calculating step further includes modifying the product of integrated velocity signals and said area with a correction factor.

8. The method of claim 7, further comprising the step of measuring the average speed of movement of the float counter to said direction under the action of said biasing force between successive pulses of the stream, and determining said correction factor as a function of measured average speed.

9. The method of claim 8, wherein the step of measuring the average speed of movement of the float counter to said direction comprises integrating signals denoting the speed of movement of the float during the period of movement of the float counter to said direction between successive pulses of the stream, and dividing the integrated signals with a value denoting said period.

10. The method of claim 9, wherein said correction factor is a product of said average speed, said value denoting said period and said area.

11. The method of claim 7, wherein said correction factor is a constant.

12. Apparatus for measuring the quantity of a fluid in a fluid stream which performs a succession of pulses, comprising a conduit having and inlet and defining a passage for the flow of the fluid stream in a direction from said inlet; a float movable in said passage in said direction by the pulsating stream and being biased to perform a movement counter to said direction between successive pulses of the stream; means for measuring the velocity of movement of the float in said passage including at least one coil surrounding said conduit to generate voltage signals in response to movement of said float in said direction; and means for evaluating said voltage signals, said at least one coil having a signal transmitting output and said evaluating means comprising an integrating circuit for the signals which are transmitted by said output and a peak value measuring circuit connected with said integrating circuit.

13. The apparatus of claim 12, wherein said conduit consists of magnetically nonconductive material, said measuring means further comprising a magnetic field generator movable in said passage with said float and said at least one signal generating coil having turns the density of which per unit length of said conduit varies in said direction.

14. The apparatus of claim 13, wherein said density only increases in one of the directions including said direction from said inlet and a direction counter to said direction from said inlet.

15. The apparatus of claim 12, further comprising means for limiting the extent of movability of said float in said direction.

16. The apparatus of claim 12, further comprising means for limiting the extent of movability of said float counter to said direction.

17. The apparatus of claim 12, further comprising means for confining said float to movements within a first portion of said conduit, said measuring means including at least one coil surrounding said first portion of said conduit as well as at least one second portion of said conduit adjacent said first portion.

18. The apparatus of claim 17, wherein said passage has a diameter D and said second portion of said conduit has a length approximating 2D.

19. The apparatus of claim 12, wherein said passage has a constant diameter and said at least one coil has turns the density of which per unit length of said conduit increases substantially linearly in one of two directions including said direction from said inlet and a direction counter to said direction from said inlet.

20. The apparatus of claim 19, wherein said density increases in said direction from said inlet.

21. The apparatus of claim 12, wherein said at least one coil has turns the density of which per unit length of said conduit varies in steps in one of two directions including said direction from said inlet and a direction counter to said direction from said inlet.

22. The apparatus of claim 21, wherein said measuring means further comprises a magnetic field generator movable in said passage with said float and having a first length in said direction, each of said steps having a second length which at most equals said first length.

23. The apparatus of claim 22, wherein the density of said turns per unit length of the conduit increases in said one direction.

24. The apparatus of claim 12, wherein said passage has a diameter which varies in said direction, said at least one coil having turns the density of which per unit length of the conduit varies as a function of variations of said diameter.

25. The apparatus of claim 12, wherein said measuring means comprises a plurality of coils having turns which surround said conduit, said coils being immediately adjacent one another.

26. The apparatus of claim 25, wherein said measuring means further comprises a magnetic field generator movable in said passage with said float to induce voltage in said coils in response to movement of said generator in said passage, said coils having discrete outputs and said measuring means further comprising discrete voltage amplifiers connected to the outputs of said coils.

27. The apparatus of claim 12, wherein said measuring means comprises a magnetic field generator movable in said passage with said float, said at least one signal generating coil having turns the density of which per unit length of said conduit varies in said direction, and said at least one coil further having an output, and further comprising a low pass filter connected between said output and said evaluating means.

28. The apparatus of claim 12, wherein said measuring means further comprises a magnetic field generator movable in said passage with said float, said at least one signal generating coil having turns the density of which per unit length of said conduit varies in said direction.

29. The apparatus of claim 12, wherein said evaluating means further comprises a discriminator circuit connected between said output and said integrating circuit to energize said integrating circuit when the intensity of signals at said output exceeds a first value and to deenergize said integrating circuit when the intensity of signals at said output is below a second value.

30. The apparatus of claim 12, further comprising resilient means for biasing said float counter to said direction.

* * * * *